(12) United States Patent
Nakamura

(10) Patent No.: US 8,888,572 B2
(45) Date of Patent: Nov. 18, 2014

(54) BATTERY COOLING STRUCTURE

(75) Inventor: Mitsuyoshi Nakamura, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1056 days.

(21) Appl. No.: 12/557,101

(22) Filed: Sep. 10, 2009

(65) Prior Publication Data

US 2010/0059208 A1    Mar. 11, 2010

(30) Foreign Application Priority Data

Sep. 11, 2008 (JP) ................. 2008-233109

(51) Int. Cl.

| | | |
|---|---|---|
| B24D 13/00 | (2006.01) | |
| H01M 2/10 | (2006.01) | |
| B60K 1/04 | (2006.01) | |
| H01M 10/613 | (2014.01) | |
| H01M 10/625 | (2014.01) | |
| H01M 10/6556 | (2014.01) | |
| H01M 10/6563 | (2014.01) | |
| H01M 10/6566 | (2014.01) | |
| B60K 1/00 | (2006.01) | |

(52) U.S. Cl.
CPC .............. *H01M 2/1083* (2013.01); *B60K 1/04* (2013.01); *H01M 10/5004* (2013.01); *H01M 10/5016* (2013.01); *H01M 10/5057* (2013.01); *H01M 10/5067* (2013.01); *H01M 10/5073* (2013.01); *B60K 2001/005* (2013.01)
USPC ........................................................ 454/69

(58) Field of Classification Search
USPC ............................... 454/69, 141, 49; 180/65.1
See application file for complete search history.

(56) References Cited

U.S. PATENT DOCUMENTS

| | | | | |
|---|---|---|---|---|
| 5,029,451 | A * | 7/1991 | Imaiida et al. | ............... 62/259.1 |
| 5,558,949 | A * | 9/1996 | Iwatsuki et al. | ................. 429/99 |
| 6,662,891 | B2 * | 12/2003 | Misu et al. | .................... 180/68.1 |
| 6,931,878 | B2 * | 8/2005 | Kubota et al. | ................. 62/259.2 |
| 7,963,831 | B2 * | 6/2011 | He et al. | ......................... 454/142 |
| 2004/0010357 | A1 | 1/2004 | Kubota et al. | |
| 2009/0192681 | A1 * | 7/2009 | Hayashi et al. | ................. 701/45 |

FOREIGN PATENT DOCUMENTS

| | | | |
|---|---|---|---|
| CN | 101138963 | | 3/2008 |
| JP | UM-55-139220 | | 10/1980 |
| JP | UM-06-053250 | | 7/1994 |
| JP | 11195437 | A * | 7/1999 |
| JP | 2004-042698 | | 2/2004 |
| JP | 2005-071759 | | 3/2005 |
| JP | 2006-335244 | | 12/2006 |
| JP | 2008-062781 | | 3/2008 |
| JP | 2008-149765 | | 7/2008 |

OTHER PUBLICATIONS

Chinese Office Action and English Translation, Applicant—Honda Motor Co., Ltd, Dated Apr. 6, 2012, Seven Pages.

* cited by examiner

*Primary Examiner* — Steven B McAllister
*Assistant Examiner* — Brittany Towns
(74) *Attorney, Agent, or Firm* — Rankin, Hill & Clark LLP

(57) ABSTRACT

A battery cooling structure which cools a battery equipped on a vehicle, the battery cooling structure including: a fan sending an air to cool the battery; and a sound insulation wall including a sound insulation material which insulates noise wherein the sound insulation wall faces an exhaust outlet of the fan.

4 Claims, 3 Drawing Sheets

BATTERY COOLING STRUCTURE

BACKGROUND OF THE INVENTION

The present application claims priority on Japanese Patent Application No. 2008-233109, filed Sep. 11, 2008, the content of which is incorporated herein by reference.

FIELD OF THE INVENTION

The present invention relates to a battery cooling structure. The cooling structure cools a battery equipped in a vehicle by sending air to the battery.

DESCRIPTION OF THE RELATED ART

High voltage batteries are equipped on battery vehicles, hybrid vehicles, and the like, in order to supply energy to the vehicle. Such high voltage batteries emit a large amount of heat. Therefore, increases in temperature have been restrained by using a fan that sends air (refer to, for example, Japanese Unexamined Patent Application, First Publication No. 2004-42698 (hereinafter referred to as "Patent Document 1")).

According to the battery cooling structure disclosed in Patent Document 1, a battery box is placed on the back side of a rear seat. A suction duct and a discharge duct are connected to the battery box. The suction duct opens toward the interior of the vehicle. At the same time, the discharge duct opens toward the space in a side of a rear luggage compartment. The discharge duct is equipped with a fan. The air inside the vehicle is brought into the interior of the battery box by the suction force of the fan. The battery is thus cooled by this air being led into the battery box. After the heat of the battery is transferred to the air that was brought into the battery box, the air is ejected through the fan toward the space in the side of the rear luggage compartment. At this time, the noise of the fan blowing the air is suppressed by the space in the side of the rear luggage compartment.

Since the battery cooling structure configured in this way suppresses the noise of the fan by using the space in the side of the rear luggage compartment, some vehicles do not have enough space to suppress the sound of the fan. Thus, it is desirable that the battery cooling structure be improved on this aspect.

Accordingly, an object of the present invention is to provide a battery cooling structure that can adequately suppress the noise of the fan without requiring too much space, thereby making the vehicle smaller and quieter.

SUMMARY OF THE INVENTION

In order to achieve the above object, the present invention employs the following.

Namely, a battery cooling structure according to an aspect of the present invention cools a battery equipped on a vehicle, the battery cooling structure including: a fan sending an air to cool the battery; and a sound insulation wall including a sound insulation material which insulates noise wherein the sound insulation wall faces the exhaust outlet of the fan.

Based on the battery cooling structure according to the aspect of the present invention described above, the battery is cooled by the air blown by the operation of the fan. The sound of the fan is suppressed because the air blown by the fan hits the sound insulation material of the sound insulation wall at the side of the luggage compartment of the vehicle. Thus, suppressing the sound of the fan does not require a large amount of space. Furthermore, the noise of the fan can be reduced effectively. Thus, according to the present invention, the vehicle can be made smaller and quieter.

In addition, the battery cooling structure according to an aspect of the present invention may be configured as follows: the sound insulation wall is placed outside of an interior material of a luggage compartment of the vehicle.

Based on the battery cooling structure according to the aspect of the present invention described above, the air blown by the fan hits the sound insulation material of the sound insulation wall at the outer side position of the luggage compartment of the vehicle. As a result, the noise of the fan can be suppressed. Moreover, the noise and vibration of the fan are prevented from being communicated to the interior of the vehicle through the luggage compartment. Therefore, the present invention enables the length of the vehicle in the longitudinal direction to be shortened without interfering with the noise-reducing effect.

In addition, the battery cooling structure according to an aspect of the present invention may be configured as follows: an extension part, extending outside of the luggage compartment, is placed on the interior material; and the sound insulation wall is formed on the extension part.

Based on the battery cooling structure according to the aspect of the present invention described above, the air blown by the fan hits the sound insulation wall of the extended portion extending toward the outer side of the luggage compartment. The sound of the fan is thus suppressed by the sound insulation material of the sound insulation wall. Since the noise of the fan is suppressed by the air, blown by the fan, hitting the sound insulation wall of the extended portion, the sound insulation portion can be further separated from the luggage compartment. Accordingly, the noise and vibration of the fan can be more adequately prevented from being communicated to the interior of the vehicle through the luggage compartment. In addition, the interior of the vehicle can be made much quieter.

In addition, the battery cooling structure according to an aspect of the present invention may be configured as follows: the interior material includes a pair of side wall portions on both sides of the vehicle in a vehicle-width direction, and a floor part connecting the pair of side wall portions and forming a base of the luggage compartment; the fan is placed outside of the luggage compartment, so that the exhaust outlet faces an inside portion of the vehicle in the vehicle-width direction; and the sound insulation wall extends downward from the floor part.

Based on the battery cooling structure according to the aspect of the present invention described above, the discharged air is blown from the fan toward the interior of the vehicle in the vehicle-width direction. This discharged air hits the sound insulation wall extending from the floor portion of the interior material in the downward direction. In this way, the noise from the fan is suppressed by the sound insulation material of the sound insulation wall. As a result, the battery cooling structure does not require a lot of space in the longitudinal length of the vehicle. At the same time, the noise of the fan is effectively reduced. Furthermore, the noise and vibration of the fan can be prevented from being communicated to the interior of the vehicle through the luggage compartment. Therefore, the present invention enables the length of the vehicle in the longitudinal direction to be shortened without interfering with the noise-reducing effect.

DETAILED DESCRIPTION OF THE PREFERRED EMBODIMENTS

Figure 1:
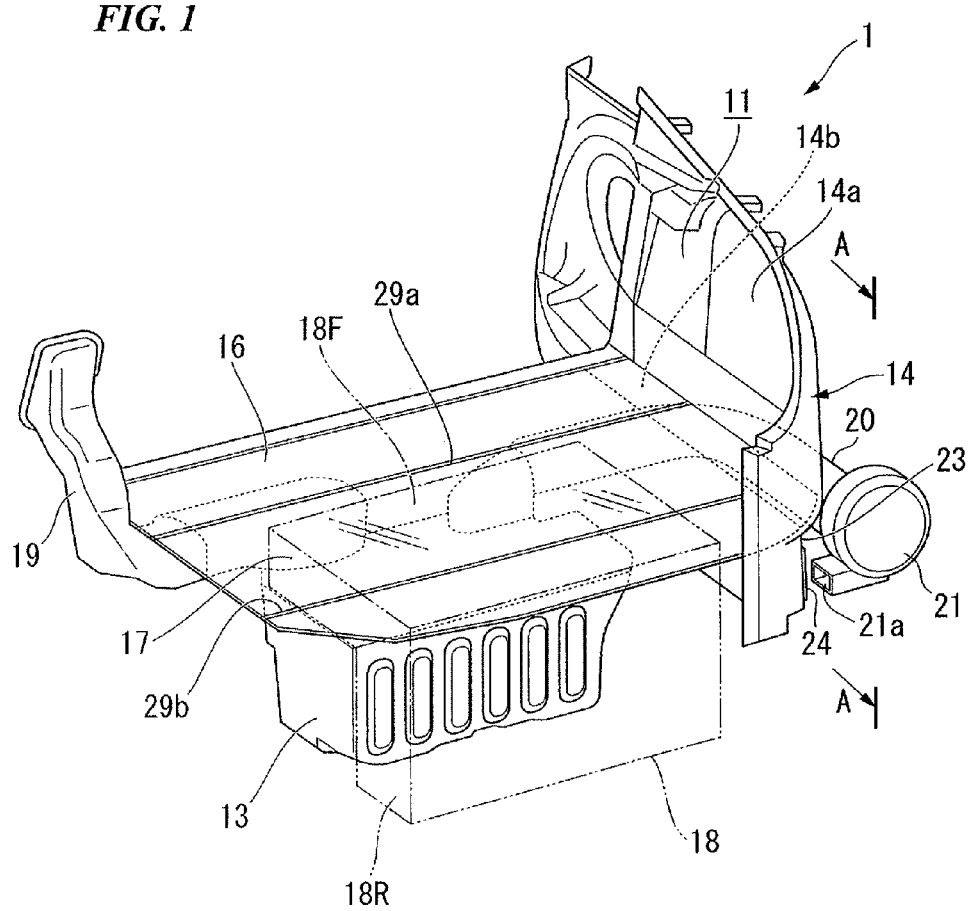
FIG. 1 is a perspective view of a rear portion of a vehicle seen from an upper diagonal side of a backside of the vehicle according to an embodiment of the present invention.

Hereinunder, an embodiment of a battery cooling structure according to the present invention is described with reference to FIGS. 1 to 3.

As described above, FIG. 1 is a generalized perspective view of a rear portion of a vehicle I seen from an upper diagonal side of a backside of the vehicle 1 equipped with the battery cooling structure according to the present invention. FIG. 2 is a plane view of a model of the rear portion of the vehicle 1. FIG. 3 is a cross sectional view of FIG. 1 showing the vehicle 1, corresponding to an A-A cross section. In order to facilitate the description of the internal structure, some of the parts placed near the viewpoint of FIG. 1 are omitted from FIG. 1.

Figure 2:
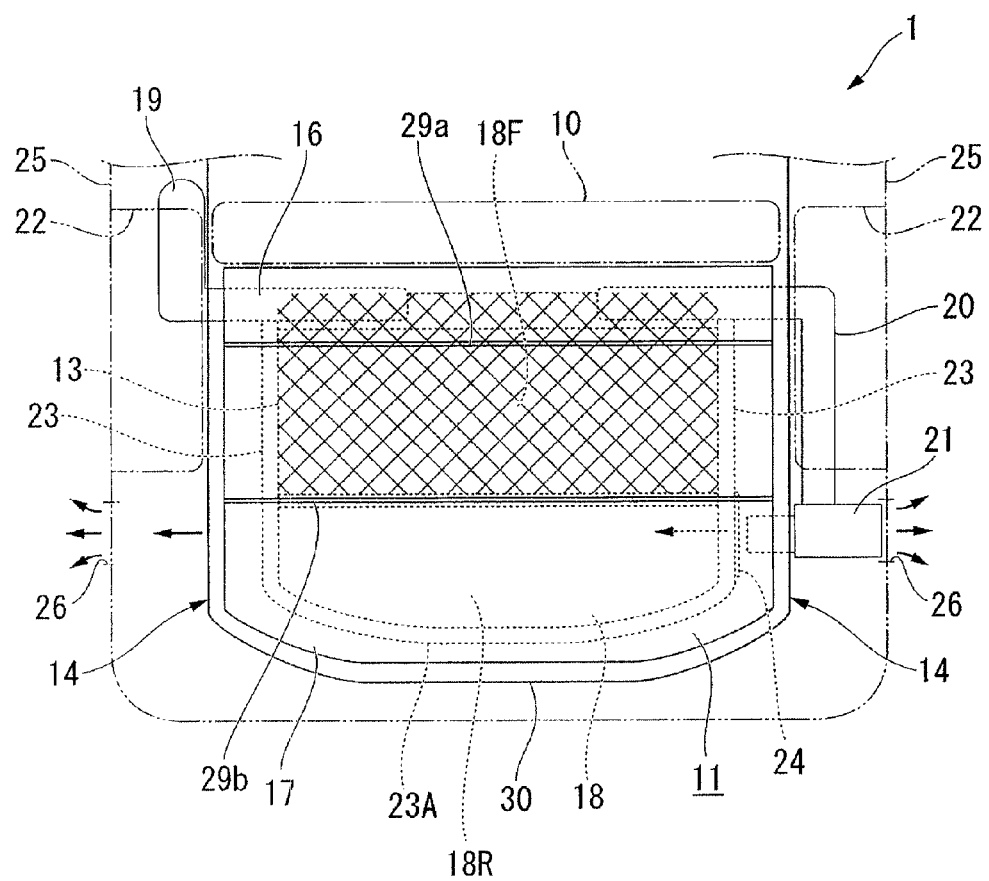
FIG. 2 is a plane view of a model of a rear portion of a vehicle according to the above embodiment of the present invention.

The vehicle 1 according to the present embodiment includes a luggage compartment 11 in a back side of a rear seat 10 (refer to FIG. 2). The luggage compartment 11 is connected with an interior of the vehicle 1. As shown in FIG. 1, a battery box 13 is placed in a lower part of a frontal section of the luggage compartment 11. The battery box stores a high-voltage battery.

The luggage compartment 11 is formed by a rear side panel 14, which is an interior material placed on both sides of the luggage compartment 11 in the vehicle-width direction. The luggage compartment 11 is also formed by the rear seat placed in the front side of the luggage compartment 11. The luggage compartment 11 is further formed by a rear panel 30 placed in the back side of the luggage compartment 11 (refer to FIG. 2). The rear side panel 14, placed on both sides of the luggage compartment 11 in the vehicle-width direction, is supported by a rear frame 15 (refer to FIG. 3) and a cross member (not diagramed). The rear frame 15 extends along the front-back direction of the vehicle body.

In addition, the rear side panel 14, placed on both sides of the luggage compartment 11 in the vehicle-width direction, includes a step wall 14b (floor portion). The step wall 14b bends from a main body panel 14a toward the interior in the vehicle-width direction. The main body panel 14a makes up a side wall portion of the luggage compartment 11. The rear side panels 14 are connected to each other by a luggage compartment floor panel 16 (floor portion) which is placed on an upper plane of the step wall 14b of the rear side panels 14. The luggage compartment floor panel 16 is placed in a front portion of the luggage compartment 11. The battery box 13 and a floor lid 17 are placed in a back side of the luggage compartment floor panel 16 so that the floor lid 17 can be opened and shut. The floor lid 17 covers an upper part of a space in a back side of the battery box 13. As shown in FIGS. 1-2, a trunk box 18 is placed in a space in the upper and back sides of the battery box 13. The trunk box 18 has multiple concaved storage portions (not diagramed) in order to store tools and other materials. The trunk box 18 has a front box portion 18F and a back box portion 18R. The back box portion 18R has concaved storage portions that are deeper than those in the front box portion 18f. The front box portion 18F is interposed between the upper plane of the battery box 13 and a lower plane of the luggage compartment floor panel 16. The front box portion 18F thus supports the luggage compartment floor panel 16 from below.

The floor lid 17 makes up the floor of the luggage compartment 11 along with the luggage compartment floor panel 16 and the step wall 14b. When goods are placed in and taken out from the front box portion 18F of the trunk box 18, the floor lid 17 can be opened and shut by being rotated about a hinge 29a placed toward the side of the luggage compartment floor panel 16. Here, the hinge 29a acts as a fulcrum. On the other hand, when goods are placed in and taken out from the rear box portion 18R of the trunk box 18, the floor lid 17 can be opened and shut by being rotated about a back-side hinge 29b acting as a fulcrum.

A suction duct 19 and a discharge duct 20 are connected to the upper plane of battery box 13 in the side of the front portion of the vehicle. The suction duct 19 and the discharge duct 20 supply air to the battery box 13 and also eject air from the battery box 13. The air is used to cool the battery. The suction duct 19 is pulled out from a lower part of the luggage compartment floor panel 16 to an upper side part of the luggage compartment floor panel 16. An end portion of the suction duct 19 opens toward the interior of the interior of the vehicle (hereinafter may be referred to as the "vehicle chamber"). As a result, air from within the vehicle chamber is led inside the battery box 13 through the suction duct 19. Meanwhile, the discharge duct 20 is pulled out from a lower part of the luggage compartment floor panel 16 to an exterior side of one of the rear side panels 14 (toward the outside in the vehicle-width direction). The discharge duct 20 is further extended toward the rear portion of the vehicle body along the rear side panel 14. A fan 21 is connected to a tip portion of the discharge duct 20. The air within the vehicle chamber is brought into the battery box 13 through the suction force of the fan 21. The fan 21 is fixed at an upper portion of the rear frame 15. The rear frame 15 is placed in a back side of the vehicle with respect to a rear wheel house 22 (refer to FIG. 2). An exhaust outlet 21a of the fan 21 faces the interior of the vehicle in the vehicle-width direction. Consequently, the air ejected from the fan 21 is blown toward the interior of the vehicle in the vehicle-width direction.

Meanwhile, an extension wall 23 (extension portion) is integrally placed on both of the rear side panels 14. The extension wall 23 bends downward perpendicularly from an end portion of the step wall 14b (floor portion) located toward the inside portion in the vehicle-width direction. According to the present embodiment, a similar second extension wall 23A is placed on the rear panel 30 in a rear portion of the vehicle (refer to FIG. 2). The extension walls 23 of the right and left rear side panels 14 are connected to each other through the second extension wall 23A.

The exhaust outlet 21a of the fan 21 faces a plane, located in an exterior side in the vehicle-width direction, on the extension wall 23 of one of the rear side panels 14. According to the present embodiment, the extension wall 23 forms a sound insulation wall. Furthermore, a sound insulation material 24 is placed on the plane on the extension wall 23 facing the exhaust outlet 21a of the fan 21. The sound insulation material 24 can effectively insulate noise. Urethane is an example of such sound insulation material 24. The air ejected from the fan 21 hits the sound insulation material 24 of the extension wall 23 The noise of the fan 21 is thus reduced.

Figure 3:
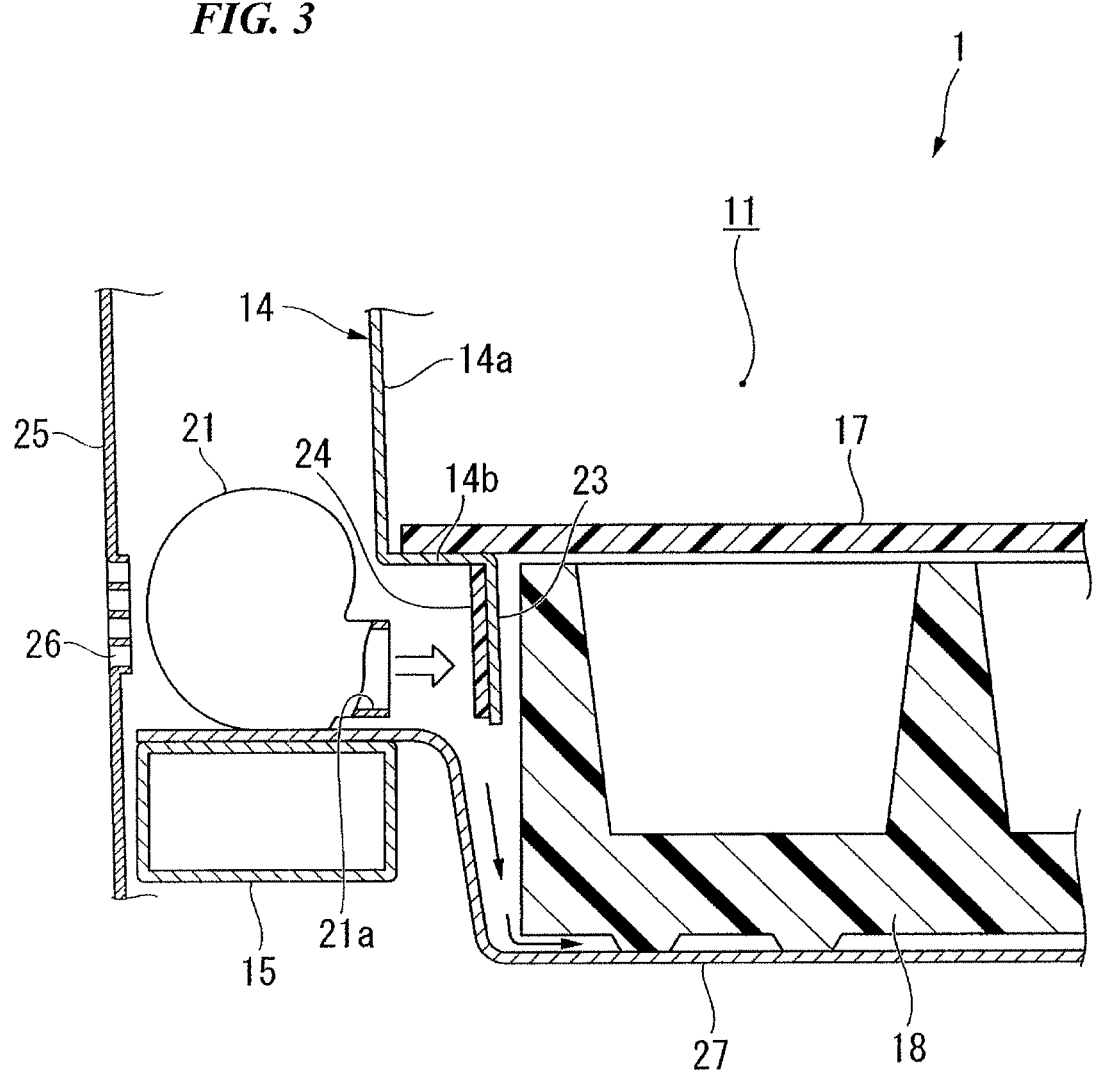
FIG. 3 is cross sectional view of FIG. 1 corresponding to an A-A cross section according to the above embodiment of the present invention.

As shown in FIGS. 2-3, an outer panel 25 of the vehicle body is placed at the exterior side of each of the right and left rear side panels 14. A discharge spout 26 is placed on the outer panel 25 at a position (in the front and back side of the vehicle) approximately equal to the position at which the fan 21 is placed.

As described above, the air ejected from the exhaust outlet 21a of the fan 21 hits the extension wall 23 including the sound insulation material 24. A large portion of the air that hits the extension wall 23 flows around the lower part of the trunk box 18 and the battery box 13 as well as the area surrounding the trunk box 18 and the battery box 13. This air is then ejected to the exterior of the vehicle through the discharge spout 26 of the outer panel 25 placed in the other side of the vehicle-width. In addition, part of the air that hits the second extension wall 23 at this time changes its direction so that the air flows in the direction opposite to the direction in which the fan is blowing. This air is then ejected to the exterior of the vehicle through the discharge spout 26 of the outer panel 25 placed in the same side as the fan 21.

Incidentally, a panel material 27 shown in FIG. 3 is placed below the battery box 13 at the bottom of the vehicle body.

Based on the battery cooling structure according to the present configuration, air inside the vehicle chamber is blown into the interior of the battery box 13 by the suction effect of the fan 21. After the heat of the battery is transferred to air inside the battery box 13, the air (waste heat air) is ejected from the exhaust outlet 21a to the outside of the luggage compartment 11. As a result, increases in the temperature of the battery placed inside the battery box 13 can be constantly restrained.

In addition, according to the battery cooling structure described above, the exhaust outlet 21a of the fan 21 faces an exterior side of the vehicle of the extension wall 23 extending downward from the side wall 14b of the rear side panel 14. Furthermore, the air blown from the exhaust outlet 21a hits the sound insulation material 24 on the extension wall 23. Thus, even though a vehicle only has very small space that cannot effectively muffle the sound of the fan, the sound insulation material 24 can adequately reduce the noise of the fan blowing air.

Furthermore, based on the battery cooling structure according to the present embodiment, the sound insulation material 24 muffles the sound of the fan 21 at a location outside of the luggage compartment 11. Therefore, the noise and vibration of the fan are effectively prevented from being communicated to the interior of the vehicle chamber through the luggage compartment 11.

In particular, according to the present embodiment, the extension wall 23 extends from the step wall 14b of the rear side panel 14 facing the luggage compartment 11 toward the lower side of the luggage compartment 11. Thus, the sound insulation material 24 reduces the noise of the fan at a location far below the luggage compartment 11. As a result, the noise and vibration of the fan are more effectively prevented from being communicated to the interior of the vehicle through the luggage compartment 11.

In addition, based on the battery cooling structure according to the present embodiment, the exhaust outlet 21a of the fan 21 faces the interior of the vehicle in the vehicle-width direction at a location outside the rear side panel 14 in the vehicle-width direction. Under this condition, the air blown from the fan 21 hits the sound insulation material 24 on the extension wall 23. Therefore, even though a vehicle does not have enough space in the back side of the rear wheel house 22, the noise of the fan 21 can be effectively reduced. Consequently, according to the present invention, the vehicle can be made both smaller and quieter at the same time.

Moreover, based on the present embodiment, the extension wall 23 of the left and right rear side panels 14 are connected to each other through the second extension wall 23A of the rear panel 30. Thus, the portion on the extension wall 23 at which the air from the fan hits can be made sturdier, suppressing the vibration of the extension wall 23 caused by the air blown by the fan.

According to the present embodiment, the second extension wall 23A connecting the left and right extension walls 23 is placed only in a rear side (rear panel 30) of the luggage compartment 11. However, a similar extension wall can be placed in a lower plane of a frontal side of the luggage compartment 11, such as a lower plane of the luggage compartment floor panel 16, so that the left and right extension walls are connected in the form of a loop.

While a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. A vehicle in combination with a battery cooling structure that cools a battery contained in the vehicle, said vehicle comprising: a luggage compartment defined by a pair of rear side panels on both sides, in a vehicle-width direction, of the luggage compartment, a rear seat on a front side of the luggage compartment, and a rear panel on a back side of the luggage compartment, each of the pair of rear side panels including a main body panel that makes up a side wall portion of the luggage compartment and a step wall that bends from the main body panel toward an interior of the vehicle in the vehicle-width direction; a luggage compartment floor panel that extends in the vehicle-width direction and connects parts of the step walls of the pair of rear side panels to each other; and a floor lid that is provided at an opening portion surrounded by the step walls of the pair of rear side panels and the luggage compartment floor panel in a freely opening and shutting manner, and said battery being received in a space beneath said luggage compartment, the battery cooling structure comprising:

an extension wall that is integrally formed from an interior end portion, in the vehicle-width direction, of the step wall of at least one of the pair of rear side panels so that the extension wall extends downwardly from the interior end portion of the step wall;

a first passageway for directing a flow of cool air toward the battery and a second passageway for directing a flow of warmed air from the battery toward a fan, said fan creating the flows of air to and from the battery, said fan being disposed downstream the main body panel of the one of the pair of rear side panels and being oriented such that exhaust air issuing from an exhaust outlet of the fan is directed toward the interior of the vehicle, in the vehicle-width direction; and a sound insulation wall including a sound insulation material that insulates noise and provided on an exterior surface, in the vehicle-width direction, of the extension wall, wherein the sound insulation wall faces the exhaust outlet of the fan.

2. The vehicle in combination with the battery cooling structure according to claim 1, wherein the sound insulation wall is placed outside of an interior material of the luggage compartment of the vehicle.

3. The vehicle in combination with the battery cooling structure according to claim 1, wherein the fan is spaced laterally outside the luggage compartment in the vehicle-width direction.

4. The vehicle in combination with the battery cooling structure according to claim 1, wherein the sound insulation wall directly faces the exhaust outlet of the fan.

* * * * *